United States Patent
Carter (10) Patent No.: US 7,934,087 B2
(45) Date of Patent: Apr. 26, 2011

(54) TECHNIQUES FOR SECURE EVENT RECORDING AND PROCESSING

(75) Inventor: Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 976 days.

(21) Appl. No.: 11/605,524

(22) Filed: Nov. 29, 2006

(65) Prior Publication Data

US 2008/0127299 A1    May 29, 2008

(51) Int. Cl.
H04L 9/32 (2006.01)
(52) U.S. Cl. ........................................... 713/150
(58) Field of Classification Search .................. 713/150
See application file for complete search history.

(56) References Cited

U.S. PATENT DOCUMENTS

| | | |
|---|---|---|
| 5,828,882 A | 10/1998 | Hinckley |
| 5,925,108 A | 7/1999 | Johnson et al. |
| 5,978,475 A | 11/1999 | Schneier et al. |
| 6,941,560 B1 | 9/2005 | Lowry et al. |
| 2002/0156785 A1 | 10/2002 | Kumar et al. |
| 2002/0157017 A1 | 10/2002 | Mi et al. |
| 2004/0054908 A1 | 3/2004 | Circenis et al. |
| 2004/0103305 A1* | 5/2004 | Ginter et al. .................. 713/200 |
| 2005/0216956 A1 | 9/2005 | Orr et al. |
| 2006/0021021 A1 | 1/2006 | Patel |
| 2006/0156398 A1 | 7/2006 | Ross et al. |

FOREIGN PATENT DOCUMENTS

EP    1560100    8/2005

OTHER PUBLICATIONS

"Security Issues in Network Event Logging (syslog)", http://www.ietf.org/html.charters/syslog-charter.html, (Nov. 2006).
Chan, Wai Tik, "Customize error logging with the Logging API", http://articles.techrepublic.com.com/5100-22_11-5035094.html?tag=rbxccnbtrl>, (Jun. 17, 2003), 5 pgs.
Garfinkel, S, et al., "Practical UNIX and Internet Security", http://docnovsu.ac.ru/oreilly/tcpip/puis/index.htm>, (Apr. 1996), Paragraph 10.5.

* cited by examiner

*Primary Examiner* — Kambiz Zand
*Assistant Examiner* — Stephen Sanders
(74) *Attorney, Agent, or Firm* — Schwegman, Lundberg & Woessner, P.A.

(57) ABSTRACT

Techniques for secure event recording and processing are provided. An application produces an event. The identity of the application is associated with the event, and the event and identity information are packaged in a secure environment as a secure event package. Subsequent consuming applications: receive the secure event package; validate the identity information; and acquire other metadata for processing the event, which is included within the secure event package.

14 Claims, 4 Drawing Sheets

FIG. 5

TECHNIQUES FOR SECURE EVENT RECORDING AND PROCESSING

FIELD

The invention relates generally to security and more particularly to techniques for secure event recording and processing.

BACKGROUND

Software services provide a variety of opportunities for enterprises and consumers to conduct business and personal affairs. By and large, these services are now interconnected over the Internet and the World-Wide Web (WWW). Furthermore, devices, which can access the WWW, are becoming increasingly smaller, mobile (portable), even more affordable.

One concern that enterprises and consumers have is over the security of their Internet transactions; and as Internet transactions steadily increase so too does malicious activities. Another concern is whether a transaction completes properly. In fact in some cases, a transaction, such as a banking transaction, may even be governed by laws or regulations that dictate a certain degree of security and tracking, which has to occur.

Transactional event logging does provide some degree of auditing and reporting about the operational capabilities associated with software services. However, it may also present security holes that are not anticipated. For example, too much detail captured in logged events, which are raised during a financial transaction, may unknowingly provide an intruder with the necessary information to penetrate a bank account or to identify particular resources that can be attacked. Event logs may also be manipulated after the fact to remove traces of malicious behavior or even to direct attention towards an innocent third party that is not involved at all.

Generally, event capturing and logging are application or service specific. That is, different services may use different logging formats and may capture different event information. Moreover, although SYSLOG has been available for many years, it not universally accepted and used. In fact, logs may be written in proprietary formats to text files (.txt extensions), log files (.log extensions), and others. Thus, compatibility among services, which interact and record events, is problematic.

Another issue is that event log security is often not addressed at all. There is a belief in the industry that should a service fail the log information should be easily retrievable and accessible to assist in debugging and resolving the problem. So by practice and by the perceived nature of event logging, security practices are often absent altogether.

Still another problem exists in that in many instances recorded events include their own proprietary taxonomy. Such recorded events may be meaningless unless their overall context or taxonomy is also known. Each service or application seems to proliferate and use its own taxonomy for events. Even standard taxonomies, such as SYSLOG, have proliferated different versions that are more customizable and extensible then previous versions. Consequently, event taxonomies tend to be extremely specific to the application or service, which raises the events in the first instance.

Thus, what are needed are techniques, which allow for improved event recording and processing.

SUMMARY

In various embodiments, techniques for secure event recording and processing are provided. More specifically, and in an embodiment, a method is provided for recording and packaging an event. An event, produced in response to an application that is processing, is identified. Next, an identity service is consulted to receive an application identity for the application. The application identity and metadata are received from the identity service. At least some of the metadata is evaluated to generate a secure package. The secure package includes the event and the application identity.

DETAILED DESCRIPTION

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output or alter other external machines or devices. It is also noted that as used herein an "application" is any resource that interacts with the services and Application Programming Interfaces (API's) described herein and below.

An "event" may be considered selective output data that is directly produced by an application or an "event" may also be considered particular processing states, which are detected by an operating system (OS) or by other services that monitor the application, such that the OS or monitoring applications produce or raise information representing the events. So, an event may be custom generated and programmed within the logic of an application or an event may be raised by third-party monitoring applications or environments, such that the application is totally unaware of the event. Moreover, an event may be associated with a defined data format (syntax), such as variable name and value pairs. An event may also be associated with a defined schema and/or taxonomy (semantics or hierarchy).

The phrase "secure package" refers to a set of data or information that securely encapsulates and describes a particular event. The secure package may include an encrypted version of an event and may also include header information that identifies taxonomy and other syntactical or semantic information associated with the event. In some cases, the secure package also includes an identifier associated with an authoring application's identity. An authoring application is one which caused or produced the event.

A secure package for an event is essentially a message that includes the information necessary to completely define the event to which it relates and the context of that event (e.g., such as taxonomy, etc.). Part of the secure package may also include protocol information or packet header information.

An "identity service" refers to a special type of service that is designed to manage and supply authentication/identity services and authentication/identity information for resources. So, an identity service may authenticate a given application, event, and/or secure package for resources. The identity service may also be used as a policy distribution point service for purposes of distributing policy associated with events defined in a secure package and for purposes of processing events.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, identity-based products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

Figure 1:
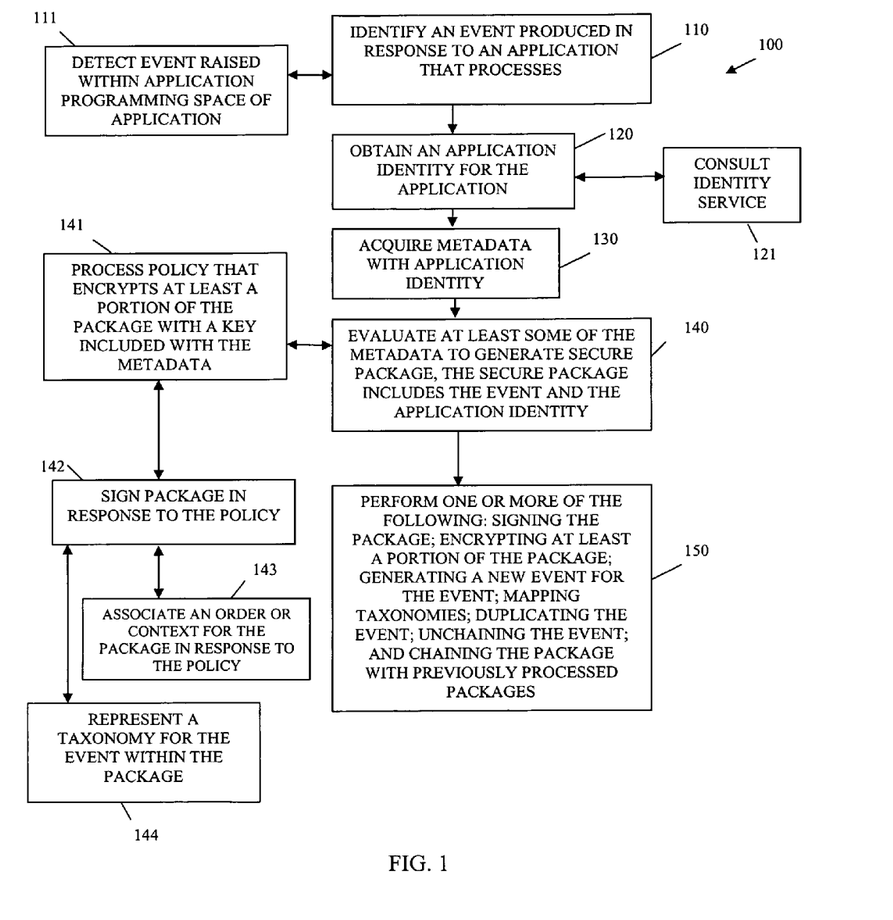
FIG. 1 is a diagram of a method for recording and packaging an event, according to an example embodiment.

FIG. 1 is a diagram of a method 100 for recording and packaging an event, according to an example embodiment.

The method 100 (hereinafter "event packaging service") is implemented as instructions in a machine-accessible and readable medium. The instructions when executed by a machine perform the processing depicted in FIG. 1. The event packaging service is also operational over and processes within a network. The network may be wired, wireless, or a combination of wired and wireless.

The event packaging service operates within an "event realm," which is a physical and/or logical processing model (architecture or environment) that allows an event to be created without exposing the event to an attack that may subvert the event information. One way to view the event realm is to consider it as part of the process address space of the application that creates the event report or via some secured intra process communication channel (e.g., secured memory sharing, etc.). The event realm provides a safe haven for gathering event information and the creation and packaging of a secure event.

One technique for achieving this is to make the event packaging service part of the operating system (OS) that processes a given application; of course other implementations may be used to effectively achieve the "event realm" processing environment for ensuring that events are securely captured and initially packaged. Those other approaches are intended to be captured by the teachings presented herein and below.

At 110, the event packaging service identifies an event produced in response to an application, which is processing within the event realm. The event may be directly produced by the application. Alternatively, the event may be produced by another application that is triggered to produce the event in response to states or actions of the processing application being monitored. In an embodiment, at 111, and as was mentioned above, this may in some cases entail detecting the event within the programming address space associated with the memory that processes the application.

At 120, the event packaging service obtains an application identity for the application. In some cases, the application identity may have previously have been cached and be available from cache for use by the event packaging service. In some cases, at 121, the event packaging service may actually consult an identity service to obtain the application identity for the application. It is noted that the event packaging service may only contact the identity service when a first event is detected with the application. So, subsequent events raised or detected for the application as it processes do not have to be used to re-consult the identity service. The identity service and the event packaging service are in a trust relationship with one another and communicate securely with one another. It may be that the event packaging service consults the identity service for the application identity for each new session of that application within the monitored programming space or event realm.

Once the event packaging service has an identity or an identifier to uniquely distinguish the application's identity, the event packaging service may use this identity to assist in subsequent packaging of the events detected as emanating from the application. Accordingly, at 130, the event packaging service also acquires other metadata associated with the application identity and event packaging procedures.

Some example metadata may include policies that instruct the event packaging service under what conditions events or events types are to packaged (e.g., discard some event types, summarize other event types, etc.), how to package the events (e.g., encrypt, sign, use certificates, etc.), and/or how and when to subsequently transmit or report the packed events (e.g., use secure sockets layer (SSL), send periodically, etc.).

The metadata may also include encryption keys associated with encryption and/or certificates that are to be used to package the events.

At 140, the event packaging service evaluates at least some of the metadata to generate a secure package, which at least encapsulates the event and includes the application identity to permit any subsequent consuming application to recognize the application as the authoring application of the event.

According to an embodiment, at 141, the event packaging service may process policy associated with the metadata returned from the identity service to encrypt at least a portion of the secure package, such as the event. In other words, a key and perhaps even an encryption technique may be identified with the metadata, and the event packaging service may use that information to encrypt the event within the package. At 142, the entire package or a portion of the secure package may also be digitally signed by the event packaging service.

In still more instances, at 143, the event packaging service may associate an order or context for the package. This may be done when the event packaging service is recording and noting a plurality of events and assembling a plurality of secure packages, which are subsequently consumed. The order or context may be represented as a number or other identifier that a consuming application can use to properly arrange subsequently extracted events from the secure packages. In other words events may be chained together in particular orders and each event being packaged can be provided a unique package number that permits them to be subsequently re-assembled in their intended and proper order.

In another situation, at 144, the event packaging service may represent a taxonomy for the event within the secure package. The event may be associated with a particular category, class, or even hierarchy and such taxonomy for the event may be included with the secure package. The taxonomy may even be viewed as a schema that provides details for resolving the syntax and semantics of a particular event. This schema may be represented in extensible markup language (XML) format as an extensible schema definition (XSD). The XSD may be included with the secure package, such that subsequent consuming applications can inspect the XSD and determine what the event represents and how to handle it. This provides for even further portability.

In some embodiments, at 150, the event packaging service may also perform a variety of processing when forming and generating the secure package for the detected event. Some examples include signing the package, encrypting a portion of the package (such as the event itself), chaining the package with previously processed packages, etc. Other examples include mapping taxonomies from the event's taxonomy specification to other event taxonomies, duplicating the event, unchaining the event, etc.

The event packaging service operates in a secure event realm to capture events and their corresponding information. An identity service is consulted, at least initially, to acquire identity information for the authoring application producing the events and other metadata. The metadata provides policies that instruct the event packaging service as to how to create a secure package for the event for subsequent transport or even recordation/storage within an event repository. The details as to how the packages may be subsequently securely consumed are presented in greater detail below with reference to the method 200 of the FIG. 2.

Figure 2:
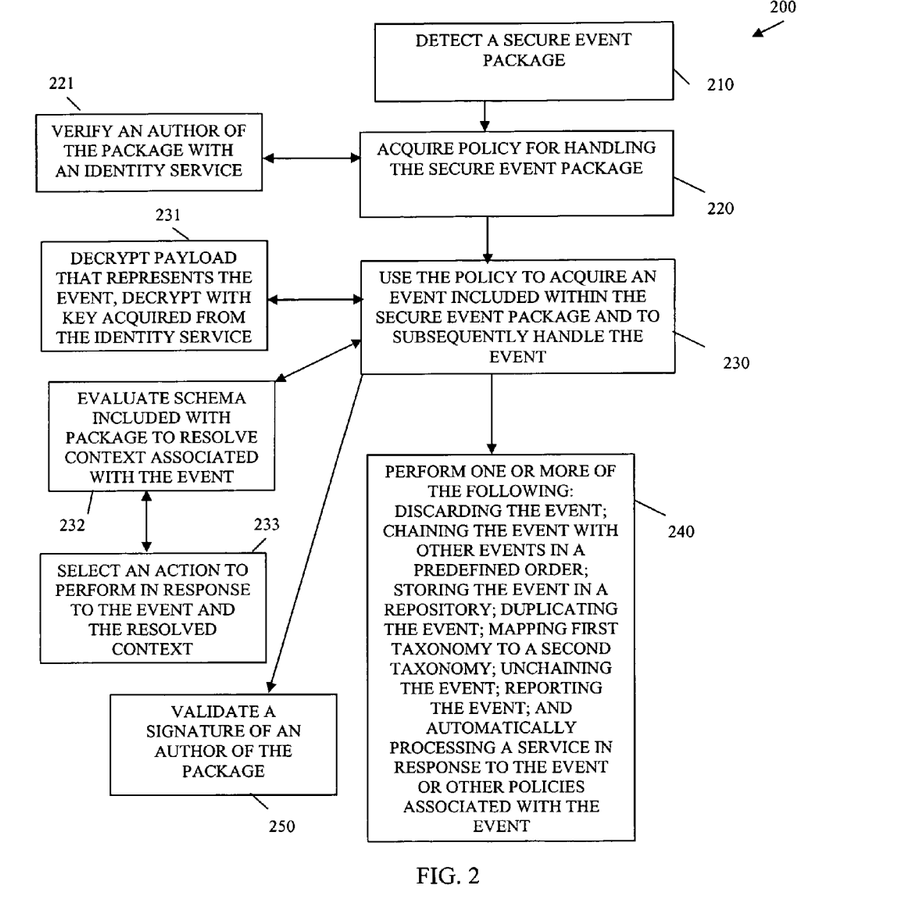
FIG. 2 is a diagram of a method for validating and processing a secure package having an event, according to an example embodiment.

FIG. 2 is a diagram of a method 200 for validating and processing a secure package having an event, according to an example embodiment. The method 200 (herein after referred to as "event consuming service") is implemented in a machine-accessible and readable medium as instructions, which when accessed by a machine performs the processing depicted in the FIG. 2. The event consuming service is also operational over a network; the network may be wired, wireless, or a combination of wired and wireless. The event consuming service processes the secure packages for events produced by the event packaging service represented by the method 100 of the FIG. 1.

Similar to the event packaging service of the method 100, the event consuming service processes within an event realm. That is, a trusted and secure environment is established within which the event consuming service executes to translate events included within secure packages. The secure packages are produced in manners described above with respect to the method 100.

At 210, the event consuming service detects the presence of a secure event package. In some cases, the secure event package may have been sent from a particular resource or it may have been affirmatively requested from a data store or repository by the event consuming service in response to a scheduled activity. For example, the event consuming service may be associated with a monthly report about a particular service and may on a defined day of the month query a report repository for event packages to process. It is also noted that the event consuming service may be a generic plug in to existing or legacy reporting applications or event consuming applications. Thus, the event consuming service may be integrated into legacy architectures as a front end service.

At 220, the event consuming service acquires policy for handling the detected secure event package. In some cases, this may occur via communication with an identity service. The event consuming service is authenticated to and in a trusted and secure relationship with the identity service. The secure event package includes an identifier, signature, and/or certificate associated with the event packaging service that produced it and/or the authoring application that produced the event embedded or encapsulated within the secure event package. At 221, consultation with the identity service permits the event consuming service to verify an author of the package. For example, the identity service may supply a key that permits the event consuming service to validate, at 250, a signature for the secure package, etc.

At 230, the event consuming service uses the acquired policy to obtain an event included within the secure event package and to subsequently handle or process the event. The identity service distributes the policy in response to identities associated with the event consuming service, the authoring application that produced the original event, and/or the event packaging service that produced the secure event package. The policy provides the processing direction to the event consuming service for handling the secure package and its encapsulated event.

For example, at 231, the policy may provide the mechanism, such as via a key, for decrypting an encrypted version of the event embedded within the secure event package. The key may be acquired from the identity service along with the policy. As another example, at 232, the policy may direct that the event consuming service evaluate a schema included with the secure event package for purposes of resolving a context associated with the embedded event. The resolved context may then be used, at 233, to select a processing action to perform against the event. So, a schema included with the secure package or even dynamically acquired from the identity service may be evaluated against information included within the secure event package to determine a context for the embedded event and this context provides a processing action for the event consuming service to take.

In fact, at 240, the event consuming service may automatically take any number of actions against the event detected within the secure event package, such as, but not limited to, discarding the event and effectively taking no action at all; chaining the event with other events in a predefined order (the secure event package may include an order number); storing the event in a repository for subsequent processing and/or reporting; reporting the event; automatically processing a service or other application in response to the event or in response to other policies associated with the event, etc.

A variety of actions can also occur at 240. For instance an event may be duplicated; the duplicated event may be chained to other events or other event chains; an event may be unchained from an existing event chain and then chained to a different event chain; an event may be unchained from an existing event chain and then dropped; an event may be duplicated and the unchained from an existing event chain and then sent to another event chain or somewhere else or even associate it with a new chain and send it elsewhere, etc.

According to still another arrangement, event taxonomies may be mapped. For example, an event may be created from a detected event by using an event taxonomy specification associated with the detected event to map to a new or different event taxonomy having a new event. Thus, new events may be generated from received or detected events and one mechanism for achieving that is via event taxonomy mapping that utilizes taxonomy specifications. It is also noted that part of an event's metadata may be the event taxonomy mapping specification that details which taxonomy mappings are to be considered by the issuing process for purposes of optimally defining taxonomy mapping.

It is apparent that the event consuming service can be a generic application that utilizes an identity service to validate secure event packages. Once validated, the event packages are associated with policies and the encapsulated events and corresponding event information is extracted. The policies are dynamically evaluated and automated actions are taken. This procedure provides an automated and secure approach to processing events. Moreover, even the structure of the events and their information may be dynamically resolved with dynamic evaluation of schemas or taxonomies associated with the secure event packages.

Figure 3:
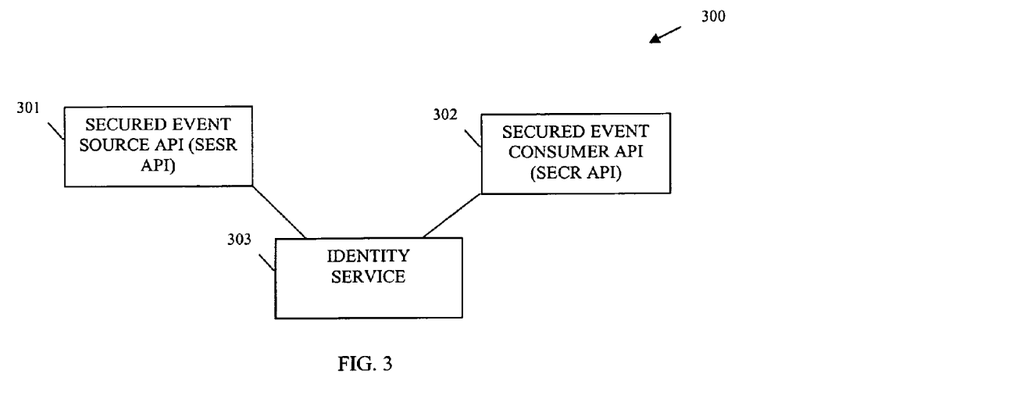
FIG. 3 is a diagram of secure event recording and processing system, according to an example embodiment.

FIG. 3 is a diagram of secure event recording and processing system 300, according to an example embodiment. The secure event recording and processing system 300 is implemented as instructions on or within a machine-accessible and readable medium. The instructions when executed by a machine perform processing depicted with respect to the methods 100 and 200 of the FIGS. 1 and 2, respectively. The secure event recording and processing system 300 is also operational over a network and the network may be wired, wireless, or a combination of wired and wireless.

The secure event recording and processing system 300 a secured event source (SESR) application programming interface (API) 301, a secured event consumer (SECR) API 302, and an identity service 303. Each of these will now be discussed in turn.

The SESR API 301 includes a variety of modules, which may be invoked and utilized by applications and services processing within an event realm (secure event recording and packaging environment). Thus, the operations and processing associated with the event packaging service represented by the method 100 of the FIG. 1 may be implemented as various component modules of the SESR API 301.

The SESR API 301 provides modules having functionality that assists an authoring application (event producing application) in authenticating to an identity service 303 in order to acquire an identity for the authoring application. Moreover, the SESR API 303 provides modules having functionality that assist in producing secure packages for events; the events are raised or produced by the authoring application.

The SESR API 301 may also provide at least one module that permits policy to be acquired and used to define the events to be packaged and the manner in which those events are to be packaged.

According to an embodiment, at least one module in the SESR API 301 is used to ensure that events are captured within or are accessible from a secure programming space of memory. The memory exists on a machine that executes the authoring application.

In another embodiment, at least one module in the SESR API 301 is used to acquire a unique identity for the authoring application. The identity or identifier for the identity is also associated by the module with each of the one or more secure event packages being produced for events that emanate from the authoring application. So, each secure package includes an identifier for the identity of the authoring application. This provides for identity-based event production or packaging.

In another situation, at least one module in the SESR API 301 is used to associate a sequence, chain, or order number for each of the one or more secure packages generated. Each number corresponds to a position or processing order for a given event with respect to other chained events.

Another module in the SESR API 301 is used to define a semantic structure and/or syntactic structure for the embedded event within a given secure package. Thus, an event may be given its own taxonomy, schema, or context relative to other events. The semantic and syntactic definitions permit subsequent consuming applications to dynamically resolve what information is present in an event and how to acquire it or recognize it within the secure package in which it is embedded.

The SECR API 302 includes a variety of modules, which may be invoked and utilized by consuming applications and services processing within an event realm (secure event recording and packaging environment). Thus, the operations and processing associated with the event consuming service represented by the method 200 of the FIG. 2 may be implemented as various component modules of the SECR API 302.

The SECR API 302 includes a variety of modules that include functionality that permits consuming applications to validate secure event packages, acquire embedded or encapsulated events within the secure event packages, and process or handle events in an automated fashion.

According to an embodiment, at least one module in the SECR API 302 may be used to validate a signature associated with a given secure event package. This permits a signature of an authoring application or even of an event packaging service (particular module within the SESR API 301) to be validated. The identity service 303 may be enlisted for assistance in validating the signatures by acquiring a key.

Another module of the SECR API 302 may be used to acquire policy from the identity service 303 associated with a given secure event package. The policy may permit a consuming application to extract an embedded event and its information. The policy may also instruct a consuming application as to how to process a particular event extracted from a particular secure vent package.

Still another module of the SECR API 302 may permit events from a plurality packages to be assembled in a proper or predefined or determined order for subsequent processing. Yet another module of the SECR API 302 may allow context for each event in a plurality of packages to be resolved or determined.

The identity service 303 acts as a policy distribution point and identity validation service for the SESR API 301 and the SECR 302. The identity service 303 establishes and ensures trust between services and distributes information that is dynamically used to validate events, package events, and process events.

Figure 4:
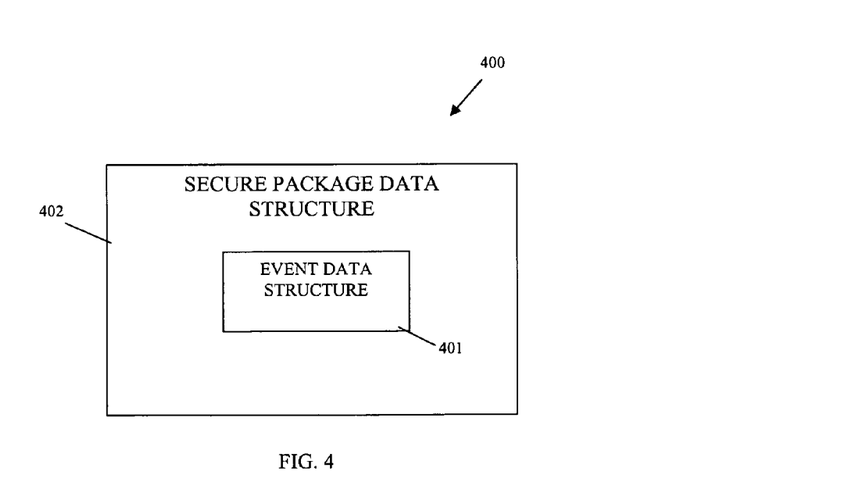
FIG. 4 is a diagram of another secure event recording and processing system, according to an example embodiment.

FIG. 4 is a diagram of another secure event recording and processing system 400, according to an example embodiment. The secure event recording and processing system 400 is implemented as instructions on or within a machine-accessible and readable medium. The instructions when executed by a machine perform processing depicted with respect to the methods 100 and 200 of the FIGS. 1 and 2, respectively. The secure event recording and processing system 400 is also operational over a network and the network may be wired, wireless, or a combination of wired and wireless. The secure event recording and processing system 400 depicted in the FIG. 4 presents an alternative arrangement and architecture to that which was presented with the secure event recording and processing system 300 represented with the FIG. 3 above.

The secure event recording and processing system 400 includes an event data structure 401 and a secure package data structure 402. Each of these will now be discussed in turn.

The event data structure 401 is generated and resides within a machine-accessible medium. The event data structure 401 is produced as an event type (perhaps associated with a hierarchy classification or taxonomy) and event information. The data format of the event data structure 401 may be in native formats produced by authoring applications (e.g., SYSLOG, etc.) or may be normalized into a more portable intermediate format via some post processing to XML.

The event data structure 401 is produced by an authoring application or is produced by another service that monitors actions of an authoring application and produces the event data structure 401 in response to those monitored actions. The event data structure 401 may be normalized by event packaging service, such as the event packaging service represented by the method 100 of the FIG. 1 and included within or in connection with a secure package data structure 402.

The secure package data structure 402 is generated and resides within a machine-accessible medium. The secure package data structure 402 may logically wrap the event data structure 401, although this does not have to be the case. In other words, although the FIG. 4 depicts the event data structure 401 as being wholly contained within the secure package data structure 402, this was done for purposes of illustration only, since the event data structure 401 may be entirely separate from other aspects that logically make up the secure package data structure 402. For example, some information associated with the secure package data structure may be included in protocol packet headers that are used to communicate the event data structure 401 to a consuming application.

The secure package data structure 402 included identity information associated with the authoring application that produced the event data structure 401 or that caused the event data structure 401 to be produced. In addition, the secure package data structure 402 includes taxonomy information associated with the event data structure 401.

According to an embodiment, the secure package data structure 402 is produced by an event packaging service, such as the method 100 represented by the method 100 of the FIG. 1 above.

In an embodiment, the taxonomy information may be presented or represented within the secure package data structure 402 as header information that is in XML format as a schema, such as an XSD.

In one arrangement, the event data structure 401 may also be represented within or in connection with the secure package data structure 402 in an encrypted format. The secure package data structure 402 may also include a chain order number for the event data structure 401. The chain order number identifies ordering for the event data structure 401 with respect to other logically associated event data structures 401.

In an embodiment, the secure package data structure 402 may also include a digital signature of the authoring application or one or more digital certificates associated with certificate authorities, the authoring application, the event packaging service, or other entities.

The identity based information obtained from the secure package data structure 402 may be submitted to a trusted identity service for purposes of obtaining policy. The policy may then drive how to extract the event data structure 401 for a consuming application and how to process it.

Figure 5:
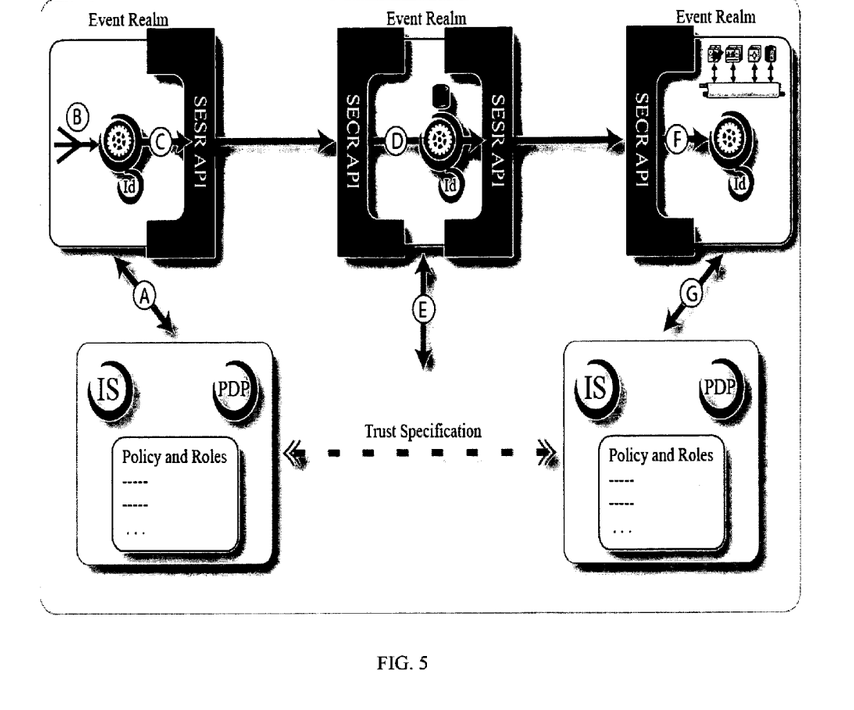
FIG. 5 is a diagram of an example architecture for a secure event recording and processing system, according to an example embodiment.

FIG. 5 is a diagram of an example architecture for a secure vent recording and processing system, according to an example embodiment. The architecture is presented for purposes of illustration only and is not intended to limit embodiments presented herein to the particular components and arrangement of components depicted in the architecture of the FIG. 5.

Initially, in an event realm at the top left of the FIG. 5 an event packaging service detects an event and event information emanating from an authoring application at B. An identity for the authoring application is acquired from an identity service (IS) via A. The identity service may use a Policy Decision Point (PDP) service to acquire and distribute policies and roles for the authoring application and the event packaging service. Interactions between the event packaging service, within the event realm, may be achieved via a SESR API that communicates with the identity service and other event realms. The event packaging service produces a secure event package according to policy from the identity service and communicates it via the SESR over C to another event realm.

The second event realm includes a SECR API that permits secure event packages received via D to be validated via E using trust specifications between the resources and one or more identity services. The policy acquired from the identity service and its PDP may result in a variety of actions on the event extracted from the secure event package and may also result in the event being packaged again via the SESR API and sent to yet another event realm.

The right most event realm receives the secure package via F and uses G to validate and to acquire policies. Again, actions may be taking on the extracted event in an automated fashion.

One now appreciates how events may be recorded, packaged, and processed in an automated fashion that supports security via dynamic identity-based policy evaluation and distribution.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method implemented in an operating system that processes on a machine, comprising:
    identifying, by the machine, an event produced in response to an application that processes;
    obtaining, by the machine, an application identity for the application;
    acquiring, by the machine, metadata associated with the application identity;
    identifying, by the machine, and from the metadata, policies that instruct the machine: under what conditions the event or a particular event type for the event is to be packaged as a secure package, how to package the event in the secure package, and how and when to subsequently transmit the secure package, and the application identity for assisting in subsequent packaging of other events detected as emanating from the application and for permitting subsequent consuming applications to the package to recognize the application via the application's identity as the authoring application of the event and to validate a signature of the authoring application, the policy provides processing direction to a subsequent event consuming service for handling the package and the event encapsulated within the secure package, and the secure package includes header information that identifies a taxonomy and semantic information for the event, the secure package complete defines the event and a context for the event, and part of the secure package includes protocol information; and
    evaluating, by the machine, the policies of the metadata to generate the secure package, the secure package includes the event and the application identity.

2. The method of claim 1, wherein obtaining further includes consulting an identity service to obtain the application identity.

3. The method of claim 1, wherein identifying further includes detecting the event being raised within an application programming space that processes the application.

4. The method of claim 1, wherein evaluating further includes processing policy that includes encrypting at least a portion of the package with a key identified in the metadata.

5. The method of claim 4, wherein evaluating further includes signing the package in response to the policy.

6. The method of claim 5, wherein evaluating further includes associating an order or a context for the package in response to the policy, wherein the order or the context is with respect a serial position for the event in view of previous order or previous context associated with other events that preceded and that may yet follow the event.

7. The method of claim 5, wherein evaluating further includes representing the taxonomy for the event within the package.

8. The method of claim 1 further comprising, performing one or more of the following:
    signing, by the machine, the package;
    encrypting, by the machine, at least a portion of the package;
    generating, by the machine, a new event for the event;
    mapping, by the machine, a taxonomy associated with the event to a different taxonomy associated with other events;
    duplicating, by the machine, the event;
    unchaining, by the machine, the event; and
    chaining, by the machine, the package with one or more previously processed packages associated with other events.

9. A machine-implemented method to execute on a machine, comprising:
    detecting, by the machine, a secure event package, the secure event package including header information that identifies a taxonomy and semantic information for an encapsulated event within the secure event package, the secure event package completely defines the encapsulated event and a context for the encapsulated event and part of the secure event package includes protocol information;
    acquiring, by the machine, policy for handling the secure event package, the policy provides processing directives for handling the secure event package and the encapsulated event within the secure event package, the policy is acquired via an identity service using a certificate acquired from the secure event package that identifies an authoring application that produced the encapsulated event and the identity service supplies a key that permits a signature of the authoring application to be validated; and
    using, by the machine, the policy to obtain the event included within the secure event package and to subsequently handle the event.

10. The method of claim 9 further comprising, in response to the policy:
    discarding, by the machine, the event;
    chaining, by the machine, the event with other events previously processed in a defined order;
    storing, by the machine, the event in a repository;
    duplicating, by the machine, the event;
    mapping, by the machine, the event associated with a first taxonomy to a different and new event associated with a second taxonomy;
    unchaining, by the machine, the event;
    reporting, by the machine, the event; and
    automatically processing, by the machine, a service in response to the event or other policies associated with the event.

11. The method of claim 9, wherein acquiring further includes verifying an author of the package with an identity service.

12. The method of claim 9, wherein using further includes decrypting a payload associated with the package, wherein the decrypted payload represents the event, and wherein the decrypted payload is decrypted via a key acquired from an identity service.

13. The method of claim 9, wherein using further includes evaluating a schema included with the package to resolve the context associated with the event.

14. The method of claim 13, wherein evaluating further includes selecting an action to perform in response to the event and the resolved context.

* * * * *